United States Patent
Koo et al.

(10) Patent No.: US 7,869,453 B2
(45) Date of Patent: Jan. 11, 2011

(54) APPARATUS AND METHOD FOR DATA TRANSFER

(75) Inventors: Hong Lee Koo, Singapore (SG); Bing Tao Xu, Singapore (SG)

(73) Assignee: Lantiq Deutschland GmbH, Neubiberg (DE)

( * ) Notice: Subject to any disclaimer, the term of this patent is extended or adjusted under 35 U.S.C. 154(b) by 1297 days.

(21) Appl. No.: 11/015,729

(22) Filed: Dec. 17, 2004

(65) Prior Publication Data

US 2006/0133400 A1 Jun. 22, 2006

(51) Int. Cl.
*H04L 12/54* (2006.01)

(52) U.S. Cl. ............... 370/428; 709/231; 712/227; 712/244

(58) Field of Classification Search ............ 370/428, 370/469, 474, 503, 412, 396, 229–235, 468, 370/389, 418, 392, 252, 395; 379/229, 225, 379/88; 709/212, 228, 229, 230, 231, 245, 709/250, 238, 236, 223, 232, 234; 710/1, 710/22, 23, 33, 40, 72; 711/167, 127; 348/718; 358/429; 726/13; 712/227, 244; 717/130
See application file for complete search history.

(56) References Cited

U.S. PATENT DOCUMENTS

| | | | | |
|---|---|---|---|---|
| 5,063,562 A * | 11/1991 | Barzilai et al. | ............... | 370/231 |
| 5,379,297 A * | 1/1995 | Glover et al. | ............... | 370/234 |
| 5,509,061 A * | 4/1996 | Amereller et al. | ........... | 379/229 |
| 6,032,190 A * | 2/2000 | Bremer et al. | ............... | 709/238 |
| 6,052,375 A | 4/2000 | Bass et al. | | |
| 6,157,955 A * | 12/2000 | Narad et al. | ................ | 709/228 |
| 6,216,205 B1 * | 4/2001 | Chin et al. | ................... | 711/131 |
| 6,275,877 B1 * | 8/2001 | Duda | ........................... | 710/23 |
| 6,907,001 B1 * | 6/2005 | Nakayama et al. | .......... | 370/230 |
| 7,017,020 B2 * | 3/2006 | Herbst et al. | ................ | 711/167 |
| 7,020,712 B1 * | 3/2006 | Chin | ......................... | 709/234 |
| 7,038,737 B1 * | 5/2006 | Kohashi et al. | ............. | 348/718 |
| 7,068,652 B2 * | 6/2006 | Lin et al. | ..................... | 370/389 |
| 7,197,044 B1 * | 3/2007 | Kadambi et al. | ............ | 370/418 |
| 7,219,238 B2 * | 5/2007 | Saito et al. | ................... | 713/193 |
| 7,466,703 B1 * | 12/2008 | Arunachalam et al. | ...... | 370/392 |
| 2001/0042174 A1 * | 11/2001 | Gupta et al. | ................ | 711/127 |
| 2002/0078267 A1 * | 6/2002 | Rozario et al. | ................ | 710/22 |
| 2004/0073703 A1 * | 4/2004 | Boucher et al. | ............ | 709/245 |
| 2004/0093438 A1 | 5/2004 | Odom | | |
| 2004/0165609 A1 * | 8/2004 | Herbst et al. | ................ | 370/412 |
| 2005/0141503 A1 * | 6/2005 | Welfeld | ...................... | 370/392 |
| 2006/0104268 A1 * | 5/2006 | Lee et al. | ..................... | 370/389 |

* cited by examiner

*Primary Examiner*—Pankaj Kumar
*Assistant Examiner*—Prenell P Jones
(74) *Attorney, Agent, or Firm*—Slater & Matsil, L.L.P.

(57) ABSTRACT

There is provided an apparatus and method for transferring data packets from a peripheral module to a memory via a memory-controller. When a given peripheral module requests that it send a data packet to the memory via the memory-controller, the memory-controller sends an acknowledgement indicating that the peripheral module can send the data packet, whether or not there is a descriptor for the data packet. If there is a descriptor, the memory-controller receives the data packet from the peripheral module and stores it in the memory. If there is not a descriptor, the memory-controller discards the data packet as it receives it. Thus, whether or not there is a descriptor available for the data packet, the peripheral module still sends the data packet to the memory-controller. The data packets may be assigned classifications and each classification may be assigned a dedicated space in the memory.

23 Claims, 2 Drawing Sheets

APPARATUS AND METHOD FOR DATA TRANSFER

TECHNICAL FIELD

The invention relates to a method and apparatus for transferring data packets from a peripheral module to a memory via a memory-controller. Particularly, but not exclusively, the invention relates to a method and apparatus for managing data transfer from a number of peripheral modules to a memory via a DMA (Direct Memory Access) Controller using the DMA protocol.

BACKGROUND

The invention is concerned with the transfer of data from a number of external peripheral modules (e.g., switches) to a memory (e.g., SDRAM) via a DMA (Direct Memory Access) Controller. At a given time, each peripheral module might have one or more data packets to be transferred to the memory via the DMA Controller.

In known arrangements, the data packets to be transferred to the memory via the DMA Controller are queued up in each peripheral module. Assuming there is sufficient memory space, the data packets are transferred sequentially, i.e., the first in the queue followed by the second in the queue and so on. However, there may only be space for certain packet classifications and not others. Thus, if a particular classification data packet is first in the queue for a given peripheral and, if there is no memory space available for the data packet's classification, the data packet cannot be transferred from the peripheral module. Therefore, the data packet will block those data packets that are behind it in the queue. The later data packets may be packets whose classifications do have memory space available, so those packets will be blocked by the earlier packets where memory space is not available and there will be congestion of packets within the peripheral.

Thus, in known arrangements, the peripheral modules often become congested, which prevents smooth operation. Also, certain data packets may be blocked, even when there is sufficient memory space for those data packets.

SUMMARY OF THE INVENTION

In one aspect, the invention provides an apparatus and method for transferring data packets from a peripheral module to a memory, which mitigates or substantially overcomes the problems of prior art arrangements described above.

In general terms, the preferred embodiment of the invention proposes that, when a given peripheral module requests that it send a data packet to the memory, via the memory-controller, the memory-controller sends an acknowledgement indicating that the peripheral module can send the data packet whether or not there is available memory space for the data packet. If there is available memory space, the memory-controller receives the data packet from the peripheral module and stores it in the memory. If there is not available memory space, the memory-controller discards the data packet as it receives it. Thus, whether or not there is a descriptor available for the data packet, the peripheral module still sends the data packet to the memory-controller. This ensures smooth operation and prevents congestion in the peripheral modules.

More specifically, according to one embodiment of the invention, there is provided a method for transferring data packets from a peripheral module to a memory via a memory-controller, the method comprising the steps of:

a) the peripheral module sending a request to the memory-controller, the request being a request for the peripheral module to transmit a data packet;

b) the memory-controller determining whether there is space available in the memory to store the data packet;

c) the memory-controller sending an acknowledgement to the peripheral module, the acknowledgement indicating that the peripheral module can transmit the data packet;

d) the peripheral module, on receipt of the acknowledgement, transmitting the data packet to the memory-controller;

e) if there is space available in the memory to store the data packet, the memory-controller storing the data packet in the memory; and f) if there is not space available in the memory to store the data packet, the memory-controller discarding the data packet.

Thus, it can be seen that the memory-controller sends an acknowledgement to the peripheral module whether or not there is space available in the memory to store the data packet. Thus, the peripheral module transmits the data packet and the memory-controller either stores the data packet in the memory (if there is space available) or discards the data packet (if there is not space available).

This means that, because a data packet is transmitted by the peripheral module whether or not there is ultimately space to store the data packet in the memory, the peripheral modules do not become congested and data packets without available memory space cannot block transfer of data packets that do have memory space available.

It is possible that the acknowledgement in the case where there is available memory space differs from the acknowledgement in the case where there is not available memory space. However, if this is the case, the two acknowledgements must both indicate to the peripheral module that it can transmit the data packet.

Preferably, the data packet is assigned a classification C. A particular peripheral module may be arranged to transmit data packets of a variety of classifications. The classification may be based on the data packet's priority.

Step b) of the memory-controller determining whether there is space available in the memory to store the data packet comprises the memory-controller determining whether there is space available in the memory for data packets of classification C. The memory-controller may determine whether there is space available in the memory for data packets of classification C by searching for a descriptor for a data packet of classification C. That is, the memory-controller may search for memory space that is allocated to storing classification C data.

Each classification will preferably have dedicated memory space in the memory. Thus, although there may be memory space for one classification (i.e., descriptors will be found for that classification), there may not be memory space for another classification (i.e., descriptors will not be available for that classification).

In one embodiment of the invention, step d) of the peripheral module transmitting the data packet to the memory-controller comprises the peripheral module transmitting a plurality of portions of the data packet sequentially. In the case where the peripheral module and the memory-controller communicate via a data bus, the size of the portions of the data packet may depend on the size of the data bus.

In that embodiment, after a portion of the data packet has been transmitted by the peripheral module, the memory-controller may send an acknowledgement to the peripheral module, the acknowledgement indicating that the peripheral module can transmit the next portion of the data packet. The peripheral module and the memory-controller preferably communicate via a data bus. Preferably, the memory-controller is a DMA (Direct Memory Access) Controller. The memory may be a RAM, an SRAM, an DRAM or an SDRAM, as examples.

According to another embodiment of the invention, there is also provided a method for managing data packet transfer from a peripheral module to a memory via a DMA (Direct Memory Access) Controller, the method comprises the steps of:

transferring a data packet from the peripheral module to the DMA Controller;

if there is space available in the memory to store the data packet, the DMA Controller sending the data packet to the memory; and if there is not space available in the memory to store the data packet, the DMA Controller discarding the data packet.

Because a data packet is transmitted by the peripheral module whether or not there is ultimately space to store the data packet in the memory, the peripheral modules do not become congested and no data packets without available memory space can block transfer of data packets with available memory space. The peripheral module is not aware whether there is available space in the memory. The DMA Controller makes the decision whether to store or discard an incoming data packet based on whether there is available memory space.

The peripheral module may transmit the data packet in portions, the portions being transmitted sequentially. The peripheral module and the memory-controller may communicate via a data bus. In the case where the peripheral module and the memory-controller communicate via a data bus, the size of the portions of the data packet may depend on the size of the data bus.

The memory may be a RAM, an SRAM, an DRAM or an SDRAM, as examples.

According to another embodiment of the invention, there is also provided apparatus for transferring data packets from a peripheral module to a memory via a memory-controller, the apparatus comprising the memory and the memory-controller, the memory-controller being arranged:

a) to receive a request from the peripheral module, the request being a request for the peripheral module to transmit a data packet;

b) to determine whether there is space available in the memory to store the data packet;

c) to send an acknowledgement to the peripheral module, the acknowledgement indicating that the peripheral module can transmit the data packet;

d) to receive the data packet from the peripheral module; and e) to store the data packet in the memory if there is space available in the memory and to discard the data packet if there is not space available in the memory.

Thus, it can be seen that the memory-controller is arranged to send an acknowledgement to the peripheral module whether or not there is space available in the memory to store the data packet. The memory-controller either stores the data packet in the memory (if there is space available) or discards the data packet (if there is not space available).

This means that, because a data packet is received by the memory-controller from the peripheral module whether or not there is ultimately space to store the data packet in the memory, the peripheral module does not become congested and no data packets without available memory space can block transfer of data packets with available memory space.

It is possible that the acknowledgement in the case where there is available memory space differs from the acknowledgement in the case where there is not available memory space. However, if this is the case, the two acknowledgements should both indicate to the peripheral module that it can transmit the data packet.

In one embodiment, the apparatus further comprises the peripheral module. The apparatus may further comprise one or more further peripheral modules.

In the case where the apparatus comprises a plurality of peripheral modules, the memory-controller may be arranged to arbitrate between the peripheral modules for the transfer of data packets. The arbitration may be based on the classification of the data packets to be transferred.

Preferably, the apparatus further comprises a data bus between the memory-controller and the peripheral module. The memory-controller may be a DMA (Direct Memory Access) Controller, as an example. The memory may be a RAM, an SRAM, an DRAM or an SDRAM, as examples.

In one embodiment, the data packet is assigned a classification C. A particular peripheral module may be arranged to transmit data packets of a variety of classifications. The classification may be based on the data packet's priority.

The memory-controller may be arranged to determine whether there is space available in the memory for data packets of classification C, e.g., by searching for a descriptor for a data packet of classification C. That is, the memory controller may be arranged to search for memory space that is allocated to storing classification C data.

Each classification will preferably have dedicated space in the memory. Thus, although there may be memory space for one classification (i.e., descriptors will be found for that classification), there may not be memory space for another classification (i.e., descriptors will not be available for that classification).

In one embodiment of the invention, the memory-controller is arranged to receive the data packet from the peripheral module in a plurality of portions received sequentially. In the case where the peripheral module and the memory-controller communicate via a data bus, the size of the portions of the data packet may depend on the size of the data bus.

In that embodiment, the memory-controller may be arranged, after a portion of the data packet has been received from the peripheral module, to send an acknowledgement to the peripheral module, the acknowledgement indicating that the peripheral module can transmit the next portion of the data packet.

That acknowledgement may be the same as or differ from the acknowledgement indicating that the peripheral module can transmit the data packet.

According to another embodiment of the invention, there is further provided apparatus for transferring data packets from a peripheral module to a memory via a memory-controller, the apparatus comprising the memory, the memory-controller and the peripheral module, the memory controller being arranged:
a) to receive a request from the peripheral module, the request being a request for the peripheral module to transmit a data packet;
b) to determine whether there is space available in the memory to store the data packet;
c) to send an acknowledgement to the peripheral module, the acknowledgement indicating that the peripheral module can transmit the data packet;
d) to receive the data packet from the peripheral module; and e) to store the data packet in the memory if there is space available in the memory or to discard the data packet if there is not space available in the memory; and the peripheral module being arranged:
to send the request to the memory-controller;
to receive the acknowledgement from the memory-controller; and
on receipt of the acknowledgement, to transmit the data packet to the memory-controller.

Thus, it can be seen that the peripheral module memory-controller is arranged to send an acknowledgement to the peripheral module whether or not there is space available in the memory to store the data packet. The peripheral module is arranged to send the data packet to the memory-controller on receipt of that acknowledgement i.e. whether or not there is space available in the memory to store the data packet. The memory-controller either stores the data packet in the memory (if there is space available) or discards the data packet (if there is not space available).

This means that, because a data packet is transmitted by the peripheral module to the memory-controller whether or not there is ultimately space to store the data packet in the memory, the peripheral module does not become congested and no data packets without memory space available can block transfer of data packets with available memory space.

The apparatus may further comprise one or more additional peripheral modules. In that case, the memory-controller may be arranged to arbitrate between the peripheral modules for the transfer of data packets. That arbitration may be based on the classifications of the data packets to be transferred.

The apparatus may further comprise a data bus for transfer of data between the memory-controller and the peripheral module.

The memory-controller may be a DMA (Direct Memory Access) Controller, as an example.

The memory may be a RAM, an SRAM, an DRAM or an SDRAM, as examples.

In one embodiment, the data packet is assigned a classification C. The peripheral module may be arranged to transmit data packets of a variety of classifications. The classification assigned to a data packet may be in accordance with the data packet's priority.

In that embodiment, the memory-controller may be arranged to determine whether there is space available in the memory for data packets of classification C, e.g., by searching for a descriptor for a data packet of classification C. That is, the memory controller may be arranged to search for memory space that is allocated to storing classification C data.

Each classification will preferably have dedicated space in the memory. Thus, although there may be memory space for one classification (i.e., descriptors will be found for that classification), there may not be memory space for another classification (i.e., descriptors will not be available for that classification).

In one embodiment, the peripheral module is arranged to transmit the data packet to the memory-controller in a plurality of portions received sequentially. In the case where the peripheral module and the memory-controller communicate via a data bus, the size of the portions of the data packet may depend on the size of the data bus.

In that embodiment, the memory-controller may be arranged, after a portion of the data packet has been received from the peripheral module, to send an acknowledgement to the peripheral module, the acknowledgement indicating that the peripheral module can transmit the next portion of the data packet.

Any features described in relation to one aspect of the invention may also be applicable to another aspect of the invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, in which.

DETAILED DESCRIPTION OF ILLUSTRATIVE EMBODIMENTS

Figure 1:
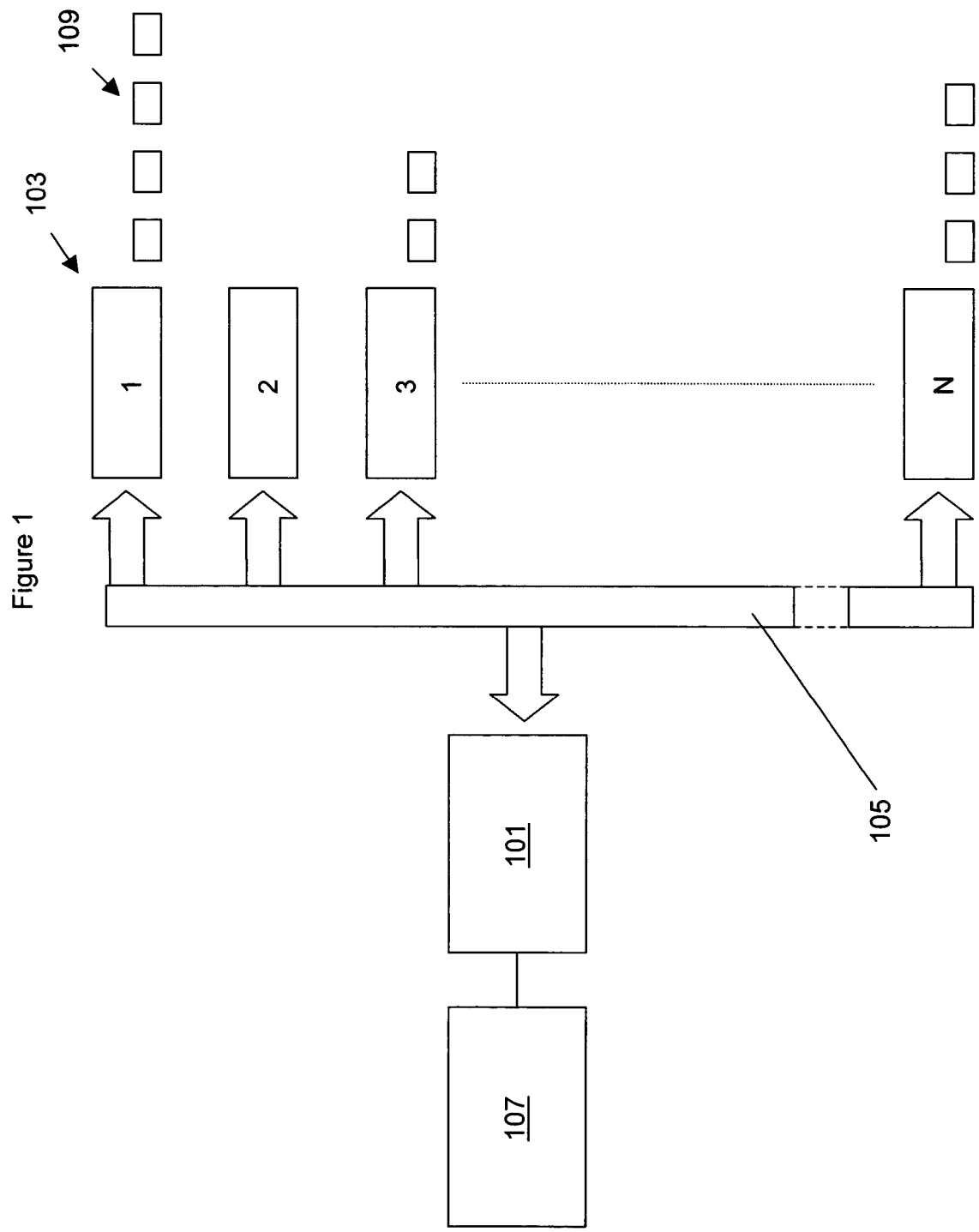
FIG. 1 illustrates a schematic diagram of a DMA arrangement according to an embodiment of the invention.

FIG. 1 shows a DMA (Direct Memory Access) Controller 101 for communicating with a plurality N of external peripheral modules 103 via a bus 105, using DMA protocol. The DMA controller 101 has access to a memory 107. The external peripheral modules may be, for example, switches or routers.

In FIG. 1, some of the peripheral modules 103 are shown with data packets 109 which are to be transferred to the memory 107. Each data packet 109 in a given peripheral queue will be assigned a particular classification. Each classification has a dedicated memory size in memory 107.

Each external peripheral module 103, when it has a data packet to be transferred to the memory 107 via the DMA Controller 101, will send a request to the DMA Controller 101 for it to transfer the data packet. At the same time, the peripheral module 103 will indicate to the DMA Controller 101 the packet classification of the data packet to be transferred. The DMA Controller 101 will look to see if there are available descriptors for that data packet's classification in the memory 107. That is, the DMA Controller 101 will establish whether there is memory space for that packet classification.

Figure 2:
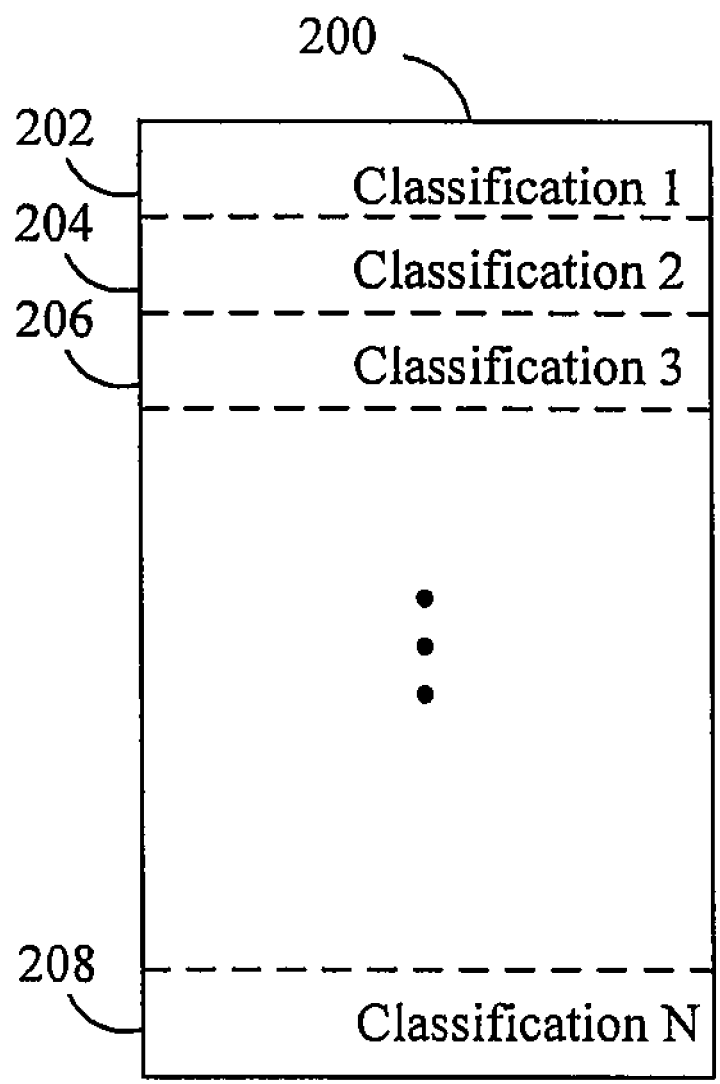
FIG. 2 illustrates an embodiment memory partition.

FIG. 2 illustrates an embodiment memory partition. Memory 200 is partitioned in to segments 202, 204, 206 and 208 corresponding to memory space for classifications 1 through N.

In the first case, when there is a descriptor available (i.e., there is memory space for that classification), the DMA Controller 101 will send an acknowledgement to the peripheral module 103 which indicates to the peripheral module 103 that the first portion of the data packet can be transferred (i.e., the acknowledge line of the peripheral is asserted by the DMA Controller). The data packet will be transferred in a number of portions rather than all at once because of the limited size of the bus 105. Once the first portion of the data packet has been received by the DMA Controller 101 and registered by the DMA Controller 101 for transfer to the memory 107, the DMA Controller 101 will send another acknowledgement to the peripheral module 103. This indicates to the peripheral module that the first portion of the data packet has been successfully transmitted to the DMA Controller 101 and registered for storage in the memory 107. It also indicates to the peripheral module 103 that the second portion of the data packet can now be transferred. Once the second portion has been transferred and registered in the DMA Controller 101 for storage in the memory 107, the DMA Controller 101 sends another acknowledgement. The process continues until the entire data packet has been transferred to the DMA Controller 101 and registered for storage in the memory 107. As the data packet is received by the DMA Controller 101, the DMA Controller 101 buffers the incoming data packet and sends it on to the memory 107.

In the second case, when there is no descriptor available (i.e., there is no memory space for that classification), the discard-packet-feature is enabled and DMA Controller 101 will send a dummy acknowledgement to the peripheral module 103 i.e., the DMA Controller asserts the acknowledge line of the peripheral module, even in this case. The peripheral module 103 receives the dummy acknowledgement and, as with a standard acknowledgement, considers that it is an indication to transfer the first portion of the data packet. So, the peripheral module 103 transfers the first portion of the data packet to the DMA Controller 101 via the bus. Because the discard-packet-feature is enabled as there is no available memory, in this case, instead of registering the first portion of the data packet for storage in the memory 107, the DMA Controller 101 simply discards the incoming data packet as it is received. Once the DMA Controller 101 has received and discarded the first portion of the data packet, the DMA Controller 101 will send another dummy acknowledgement to the peripheral module 103. The peripheral module 103 receives the second dummy acknowledgement and, as with the first dummy acknowledgement, considers that it is an indication to transfer the next portion of the data packet. So, the second portion of the data packet is transferred from the peripheral module 103 to the DMA Controller 101 and discarded. The process continues until the entire data packet has been transferred from the peripheral module 103. So, although the peripheral module transmits the data packet, the data packet, because it does not have an available descriptor, is dropped by the DMA Controller.

From the point of view of the peripheral module, there is no difference in the two processes so the peripheral modules do not need to be descriptor aware, i.e., they do not need to know whether there is or isn't memory space for their data packets. Whether or not there is space, the peripheral module will receive an acknowledgement and start to transfer the data. It is only the DMA Controller 101 which is descriptor aware, i.e., knows whether to store the data packet incoming from the peripheral module 103 in the memory or whether to discard the incoming data packet.

Therefore, consider the case where there are two packets at a given peripheral module to be transferred to the memory. The first data packet in the queue is a data packet of classification A. The second packet in the queue is a data packet of classification B. If there is no descriptor available for the classification A data packet, the discard-packet-feature is enabled. The DMA Controller asserts the acknowledge line of the peripheral and the peripheral begins to transmit the data packet, but the data packet is dropped as it arrives at the DMA Controller. Then, the classification B data packet is at the front of the packet queue in the peripheral. There is a descriptor available for the classification B data packet so the discard-packet-feature is not enabled. When the peripheral transmits the data packet, the data packet is registered by the DMA Controller. Thus, a data packet with memory space available is not blocked by a data packet without data space available; this ensures smooth operation and reduces congestion in the peripherals.

As already mentioned, each classification has a dedicated memory space. The DMA Controller 101 writes packets to the memory 107 (i.e., the DMA Controller fills up the memory) while the data packet are ready from the memory 107 by software (i.e., the software makes more memory space available). The amount of memory space available for a given classification will depend on how quickly the software can serve the data packets in the memory.

The classification of a packet can assist the DMA Controller 101 to know when to serve it, i.e., what priority to accord to it. Thus, if two peripherals send requests to the DMA Controller at the same time, the DMA Controller will know to serve the higher classification (i.e., priority) first and the lower classification (i.e. priority) second.

While the preferred embodiment of the invention has been illustrated and described, it will be appreciated that various changes can be made therein without departing from the spirit and scope of the invention as defined by the appended claims.

What is claimed is:

1. A method for transferring data packets from a peripheral module to a memory via a memory-controller, the method comprising the steps of:
    allocating the memory in a plurality of segments, wherein each segment is assigned a classification from a variety of classifications;
    the memory controller receiving from the peripheral module to transmit a first data packet, wherein the first data packet comprises a first assigned classification from the variety of classifications;
    the memory controller receiving a request from the peripheral module to transmit a second data packet, wherein the second data packet comprises a second assigned classification from the variety of classifications, the second classification different from the first classification;
    the memory-controller determining whether there is space available in the memory to store the first data packet in a memory segment of the first classification;
    the memory-controller determining whether there is space available in the memory to store the second data packet in a memory segment of the second classification;
    the memory-controller sending an acknowledgement to the peripheral module, the acknowledgement indicating that the peripheral module can transmit the first data packet;
    the memory-controller sending an acknowledgement to the peripheral module, the acknowledgement indicating that the peripheral module can transmit the second data packet;
    the memory-controller receiving the first and second data packets from the peripheral module;
    if there is space available in the memory segments of the first and second classifications, storing the first and second data packets in the memory; and
    if there is space available in the memory segment of the second classification, but no space available in the memory segment of the first classification, the memory controller storing the second data packet and discarding the first data packet.

2. The method as claimed in claim 1, wherein the memory-controller receiving the first data packet comprises receiving a plurality of portions of the first data packet sequentially.

3. The method as claimed in claim 2, further comprising, after a portion of the first data packet has been received by the memory-controller, the memory-controller sending an acknowledgement to the peripheral module, the acknowledgement indicating that the peripheral module can transmit a next portion of the first data packet.

4. The method as claimed in claim 1, wherein the peripheral module and the memory-controller communicate via a data bus.

5. The method as claimed in claim 1, wherein the memory-controller comprises a DMA (Direct Memory Access) Controller.

6. A method for managing data packet transfer from a plurality of peripheral modules to a memory via a DMA (Direct Memory Access) Controller, the method comprising the steps of:
   transferring a first data packet from a first peripheral module to the DMA Controller, wherein the first data packet comprises a first classification corresponding to a first memory segment;
   transferring a second data packet from a second peripheral module to the DMA Controller, wherein the second data packet comprises a second classification corresponding to a second memory segment;
   if there is space available to store the first data packet in the first memory segment, the DMA Controller sending the first data packet to the memory; and
   if there is not space available in the first memory segment to store the first data packet, and there is space available in the second memory segment to store the second data packet, the DMA Controller discarding the first data packet and sending the second data packet to the memory.

7. An apparatus for transferring data packets from a peripheral module to a memory via a memory-controller, the apparatus comprising the memory and the memory-controller, the memory-controller:
   receiving a request from the peripheral module, the request being a request for the peripheral module to transmit a first data packet;
   receiving a request from the peripheral module, the request being a request for the peripheral module to transmit a second data packet;
   determining whether there is space available to store the first data packet in a first segment of the memory corresponding to a first classification;
   determining whether there is space available to store the second data packet in a second segment of the memory corresponding to a second classification;
   sending an acknowledgement to the peripheral module, the acknowledgement indicating that the peripheral module can transmit the first data packet;
   sending an acknowledgement to the peripheral module, the acknowledgement indicating that the peripheral module can transmit the second data packet;
   receiving the first data packet from the peripheral module;
   receiving the second data packet from the peripheral module;
   storing the first data packet in the first segment of memory if there is space available in the first segment of the memory; and
   storing the second packet in the second segment of memory and discarding the first data packet if there is not space available in the first segment of the memory and there is space available in the second segment of memory.

8. The apparatus as claimed in claim 7, further comprising the peripheral module.

9. The apparatus as claimed in claim 8, further comprising one or more further peripheral modules.

10. The apparatus as claimed in claim 7, further comprising a data bus between the memory-controller and the peripheral module.

11. The apparatus as claimed in claim 7, wherein the memory-controller is a DMA (Direct Memory Access) Controller.

12. The apparatus as claimed in claim 7, wherein the memory-controller is arranged to receive the first data packet from the peripheral module in a plurality of portions received sequentially.

13. The apparatus as claimed in claim 12, wherein the memory-controller is arranged, after a portion of the first data packet has been received from the peripheral module, to send an acknowledgement to the peripheral module, the acknowledgement indicating that the peripheral module can transmit a next portion of the first data packet.

14. An apparatus for transferring data packets from a plurality of peripheral modules to a memory via a memory-controller, the apparatus comprising the memory, the memory-controller, a first peripheral module and a second peripheral module,
   the memory controller:
      receiving a first request from the first peripheral module, the request being a request for the first peripheral module to transmit a data packet;
      receiving a second request from the second peripheral module, the request being a request for the second peripheral module to transmit a data packet;
      determining whether there is space available to store a first data packet in a first segment of the memory corresponding to a first classification of the data packet;
      determining whether there is space available to store a second data packet in a second segment of the memory corresponding to a second classification of the data packet, the second classification different from the first classification;
      sending a first acknowledgement to the first peripheral module, the first acknowledgement indicating that the first peripheral module can transmit the first data packet;
      sending a second acknowledgement to the second peripheral module, the second acknowledgement indicating that the second peripheral module can transmit the second data packet;
      receiving the first data packet from the first peripheral module;
      the second data packet from the second peripheral module; and
      storing the first and second data packets in the memory if there is space available in the first segment of the memory to store the first data packet and if there is space available in the second segment of memory to store the second data packet;
      storing the second data packet in the memory and discarding the first data packet if there is space available in the second segment of the memory for the second data packet and there is not space available in the first segment of the memory for the first data packet; and
   the first peripheral module:
      sends the first request to the memory-controller;
      receives the first acknowledgement from the memory-controller; and
      on receipt of the first acknowledgement, transmits the first data packet to the memory-controller.

15. The apparatus as claimed in claim 14, further comprising one or more additional peripheral modules.

16. The apparatus as claimed in claim 14, further comprising a data bus between the memory-controller and the first peripheral module.

17. The apparatus as claimed in claim 7, wherein the memory-controller is a DMA (Direct Memory Access) Controller.

18. The apparatus as claimed in claim 14, wherein the first peripheral module is arranged to transmit the data packet to the memory-controller in a plurality of portions received sequentially.

19. The apparatus as claimed in claim 14, wherein the memory-controller is arranged, after a portion of the first data packet has been received from the first peripheral module, to send a third acknowledgement to the first peripheral module, the third acknowledgement indicating that the first peripheral module can transmit a next portion of the data packet.

20. A method for transferring a plurality of data packets, the method comprising:

allocating memory to a plurality of classifications;

sending a first data packet from a peripheral to a memory controller, the first data packet comprising a first classification within the plurality of classifications;

sending a second data packet from the peripheral to a memory controller, the second data packet comprising a second classification within the plurality of classifications;

receiving the first data packet by the memory controller;

receiving the second data packet by the memory controller;

discarding the first data packet after receiving the first data packet if no space is available for the first packet in allocated memory for the first classification; and storing the second data packet in allocated memory for the second classification after receiving the second data packet if there is space available for the second data packet in allocated memory for the second classification.

21. The method of claim 20, further storing the first data packet in allocated memory for the first classification after receiving the first data packet if there is space available in for the first data packet in allocated memory for the first classification.

22. The method of claim 21, further comprising the memory controller sending an acknowledgement to the peripheral that the first data packet was stored.

23. The method of claim 1, wherein the memory-controller receives the first data packet from a first peripheral module and the second data packet from a second peripheral module.

* * * * *

UNITED STATES PATENT AND TRADEMARK OFFICE
CERTIFICATE OF CORRECTION

| | | |
|---|---|---|
| PATENT NO. | : 7,869,453 B2 | Page 1 of 1 |
| APPLICATION NO. | : 11/015729 | |
| DATED | : January 11, 2011 | |
| INVENTOR(S) | : Koo et al. | |

It is certified that error appears in the above-identified patent and that said Letters Patent is hereby corrected as shown below:

In Col. 10, line 38, claim 14, before "the second data packet" insert --receiving--.

Signed and Sealed this
Twenty-ninth Day of March, 2011

David J. Kappos
*Director of the United States Patent and Trademark Office*